United States Patent
Krebs et al.

(10) Patent No.: US 9,324,239 B2
(45) Date of Patent: Apr. 26, 2016

(54) AUTHORING TOOL TO STRUCTURE AND CREATE A COMPUTER-BASED TRAINING COURSE, AND HAVING ROLE-SPECIFIC FUNCTIONS

(75) Inventors: Andreas S. Krebs, Karlsruhe (DE); Dina Glatzel, Heidelberg (DE); Martin Erhard, Karlsruhe (DE)

(73) Assignee: SAP SE, Walldorf (DE)

(*) Notice: Subject to any disclaimer, the term of this patent is extended or adjusted under 35 U.S.C. 154(b) by 2551 days.

(21) Appl. No.: 10/804,806

(22) Filed: Mar. 19, 2004

(65) Prior Publication Data

US 2005/0208461 A1  Sep. 22, 2005

(51) Int. Cl.
G09B 5/00 (2006.01)
G09B 7/00 (2006.01)

(52) U.S. Cl.
CPC ... G09B 5/00 (2013.01); G09B 7/00 (2013.01)

(58) Field of Classification Search
CPC .............. G09B 5/00; G09B 5/02; G09B 5/04
USPC .................................... 434/322, 350; 706/45
See application file for complete search history.

(56) References Cited

U.S. PATENT DOCUMENTS

| | | | | |
|---|---|---|---|---|
| 5,644,686 A * | 7/1997 | Hekmatpour | .................... | 706/45 |
| 6,202,066 B1 * | 3/2001 | Barkley et al. | .................... | 707/9 |
| 6,292,792 B1 * | 9/2001 | Baffes et al. | .................... | 706/45 |
| 6,315,572 B1 * | 11/2001 | Owens et al. | ................. | 434/322 |
| 6,412,070 B1 * | 6/2002 | Van Dyke et al. | .............. | 726/17 |
| 6,471,521 B1 * | 10/2002 | Dornbush et al. | ............. | 434/322 |
| 6,785,822 B1 * | 8/2004 | Sadhwani-Tully | ............. | 726/28 |
| 6,862,686 B1 * | 3/2005 | Bahrs et al. | ....................... | 726/3 |
| 6,917,975 B2 * | 7/2005 | Griffin et al. | ................. | 709/225 |
| 7,124,192 B2 * | 10/2006 | High et al. | .................... | 709/229 |
| 2001/0014895 A1 * | 8/2001 | Sappal | ......................... | 707/500 |
| 2004/0081951 A1 * | 4/2004 | Vigue et al. | .................. | 434/350 |
| 2004/0219494 A1 * | 11/2004 | Boon | ............................ | 434/156 |
| 2006/0271863 A1 * | 11/2006 | Cortesi | ......................... | 715/763 |

* cited by examiner

Primary Examiner — Robert J Utama
(74) Attorney, Agent, or Firm — Dilworth IP, LLC

(57) ABSTRACT

An authoring tool to structure and create a computer-based training course includes a role allocation module to facilitate an allocation of a user to at least one of an instructional design role and a content definition role with respect to the authoring tool. A function allocation module facilitates an allocation of a first set of functions, provided by the authoring tool, to the instructional design role, and also facilitates an allocation of a second set of functions, provided by the authoring tool, to the content definition role.

14 Claims, 13 Drawing Sheets

AUTHORING TOOL TO STRUCTURE AND CREATE A COMPUTER-BASED TRAINING COURSE, AND HAVING ROLE-SPECIFIC FUNCTIONS

FIELD OF THE INVENTION

The present invention relates generally to the field of computer-based training and/or learning (a.k.a., e-learning) and, more specifically, to an authoring tool to structure and create a computer-based training course having role-specific functions.

BACKGROUND OF THE INVENTION

As organizations move to become more efficient in today's competitive environments, the training of personnel of organizations is becoming increasingly important. The globalization of work and education, short innovation cycles, large amounts of information, and increased business competition have made more urgent the necessity for efficient training of personnel.

The need for training has also been increased by the widespread adoption of automated information technology systems within organizations. The utilization of computer and information systems, however, has placed an increased burden on organizations to train personnel in the utilization of such systems. While traditional training courses and seminars are of course somewhat effective, the conducting of such training courses is often limited to an employee-intake process, or are otherwise scheduled at times that are not particularly convenient for personnel. Training received too far in advance of use of a particular information tool, for example, may prove to be ineffective, while the scheduling of training courses at other times may interfere with work schedules. Accordingly, there has been a growth in the demand for so-called "just-in-time" learning and training.

One method to provide such "just-in-time" learning and training is through the deployment of computer-based training courses within an organization. Such computer-based training courses may be web-based, or alternatively may be provided as stand-alone applications to which the personnel have access. Computer-based training courses allow personnel to receive training at a time that is most beneficial (e.g., when the need arises to use a particular information tool or to perform a particular task), and at a time that is convenient.

The authoring of such computer-based training courses presents some challenges in and of itself. For a computer-based training course to be maximally effective, it is desirable that the training course be properly structured (e.g., in accordance with well-defined training course structures), and also include content that is engaging and useful to a trainee. Authoring tools that are currently available for the creation of computer-based training courses tend to be complex and user unfriendly, particularly to novice authors. Authoring tools typically provide extensive functionality, with which a novice user may not be familiar. The complexity of such tools may lead to a reluctance among authors to utilize the relevant authoring tool, and may also result in increased training costs for the authors themselves, both of which issues may contribute towards a higher total cost of ownership. The simplification of authoring tools, without sacrificing the rich functionality that such authoring tools must provide, presents a number of technical challenges.

SUMMARY OF THE INVENTION

According to one aspect of the present invention, there is provided and authoring tool to structure and create a computer-based training course. The authoring tool includes a role allocation module to facilitate an allocation of a user to at least one of an instructional design role and a content definition role with respect to the authoring tool. A function allocation module facilitates an allocation of a first set of functions, provided by the authoring tool, to the instructional design role, and also facilitates an allocation of a second set of functions, also provided by the authoring tool, to the content definition role.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An authoring tool to structure and create a computer-implemented training course, and a method of operating the same, are described. In the following description, for purposes of explanation, numerous specific details are set forth in order to provide a thorough understanding of the present invention. It will be evident, however, to one skilled in the art that the present invention may be practiced without these specific details.

Figure 1:
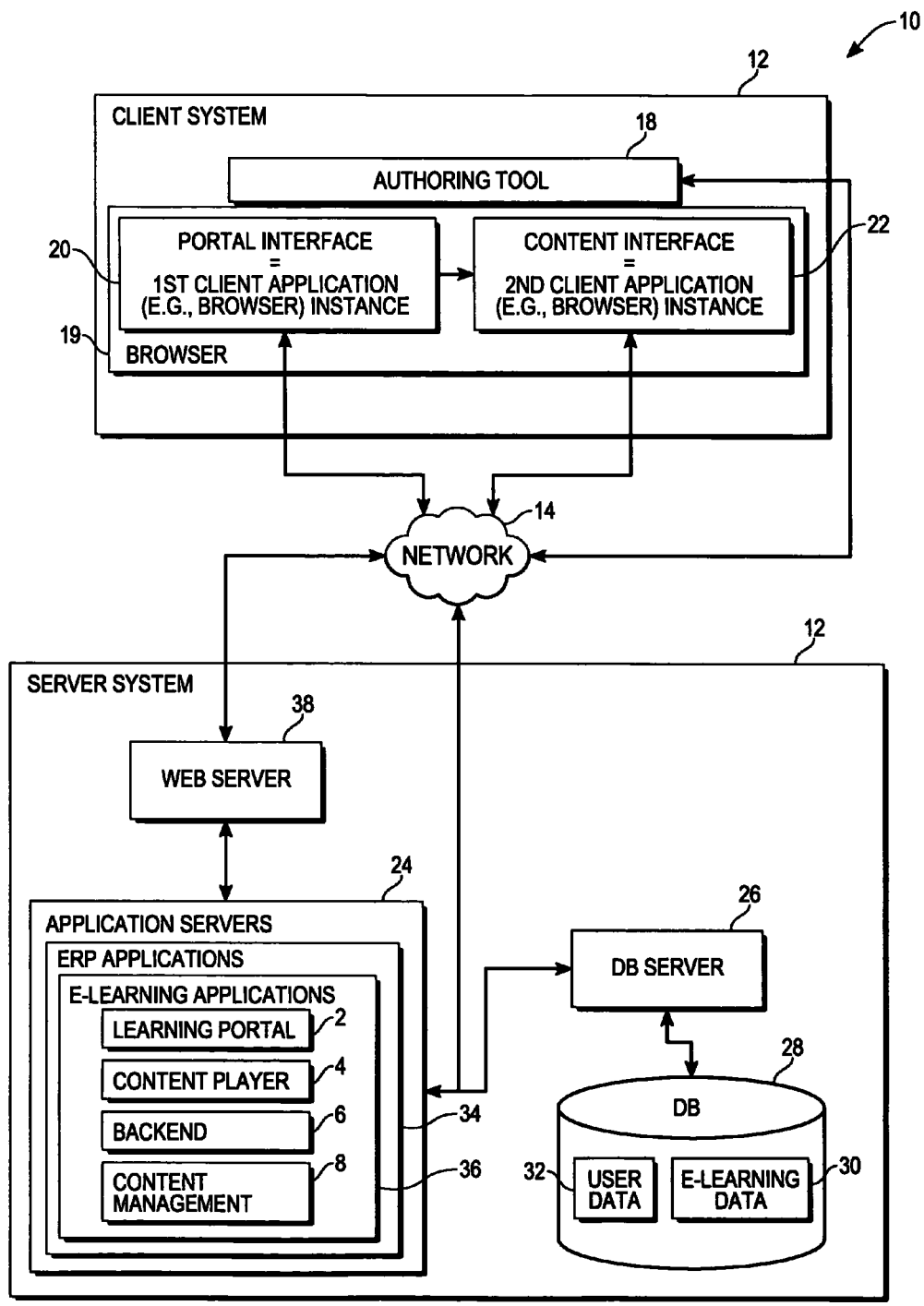
FIG. 1 is a block diagram illustrating a network environment within which an exemplary embodiment of the present invention may be deployed.

FIG. 1 is a block diagram illustrating a network environment 10 within which an exemplary embodiment of the present invention may be deployed. The present invention is of course not limited to a networked deployment, and could equally find application in a stand-alone environment. Further, while the network environment 10 is shown to deploy a client-server architecture, other network architectures (e.g., a peer-to-peer architecture) could also accommodate embodiments of the present invention.

A client system 12 is coupled via a network 14 (e.g., the Internet or an intranet) to a server system 16, so as to facilitate communications (e.g., utilizing any one of a number of well-known network communication protocols, such as HTTP) between the client system 12 and the server system 16. The client system 12 further hosts a number of client applications, namely an authoring tool 18 and a browser application 19 (e.g., MS Explorer, developed by Microsoft Corporation of Redmond, of Wash. State), which supports a portal interface 20 and a content interface 22. The authoring tool 18, according to one exemplary embodiment of the present invention, is to facilitate the structuring and creation of a computer-based training course supported within the network environment 10. The authoring tool 18 may furthermore be a Java application, with a communications interface to enable the authoring tool 18 to communicate with the server system 16, as necessary.

In one exemplary embodiment, the portal interface 20 facilitates user access to a learning portal application 2 that forms one of multiple Enterprise Resource Planning (ERP) applications 34, hosted on one or more application server 24. As will be described in further detail below, the learning portal application 2 may, inter alia, provide user access to one or more computer-based training courses, in the exemplary form of web-based training courses. The present invention is however not limited to web-based training courses, and could find equal application with respect to standalone computer-based training courses, for example, delivered on a Compact Disk (CD).

The portal interface 20 is shown to invoke the content interface 22 within which content associated with a web-based training course is presented to a user. Specifically, the content interface commutates with learning application in the form of a content player application 4, which is responsible for the delivery of content to the content interface 22. Both the portal interface 20 and the content interface 22 communicate with the server system 16 via the network 14.

Turning now to the server system 16, one or more application servers 24 are deployed to support applications, in the exemplary form of ERP applications 34, which may include computer-based training applications in the exemplary form of "e-learning" applications 36. The application servers 24 utilize a database server 26 to write data to, and retrieve data from, a database 28. The database 28 may, for example, store training data, in the exemplary form of e-learning data 30, and user data 32. The data 30 and 32 may be stored in any one of a number of forms, such as relational tables or as XML data structures. The application servers 24 are furthermore shown to be coupled to one or more web servers 38, so as to facilitate the delivery of web content (e.g., HTML, XML, streaming content, etc.) to the portal interface 20 and the content interface 22. The application servers 24 are also shown to have programmatic access, for example via an Application Program Interface (API) (not shown), so as to facilitate interactions between the application servers 24 and the authoring tool 18.

Figure 2:
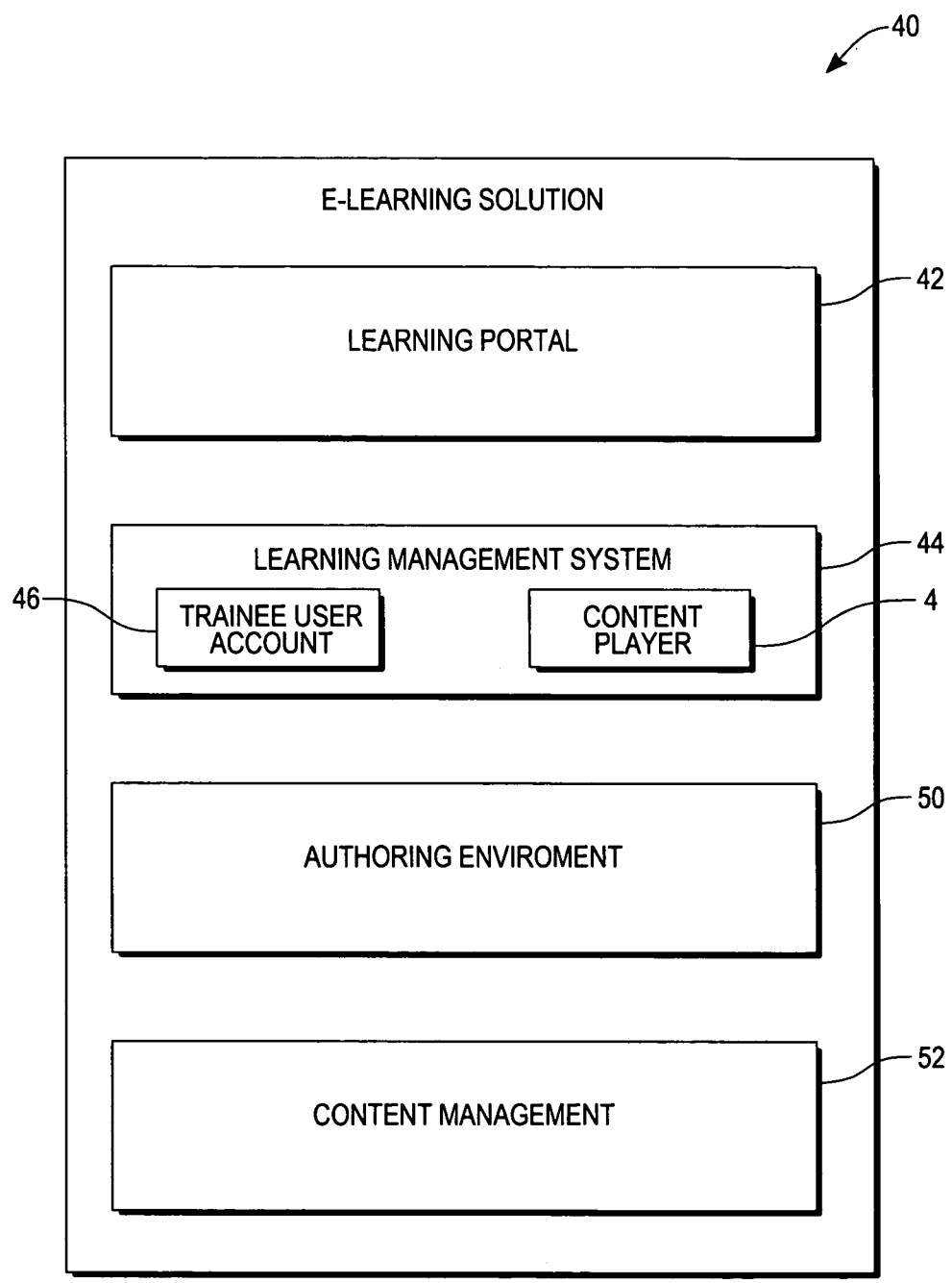
FIG. 2 is a block diagram illustrating an exemplary e-learning solution, within which the present invention may be implemented.

FIG. 2 is a block diagram illustrating an exemplary e-learning solution 40, within which the present invention may be implemented. The e-learning solution 40, as depicted conceptually in FIG. 2, may be supported by both client and server side components as discussed above with reference to FIG. 1. A learning portal 42 serves as a user interface to a trainee (or learner) user and, as described above, may be accessed via the portal interface 20 by a trainee user via a network (e.g., the Internet or an intranet). Depending on organization-specific adaptations, the learning portal 42 may display an overview of available course offerings, and provide details regarding organization training and education that can include in-person classroom training, virtual classroom training, web-based training, and other computer-based training. Such information regarding course offerings may include a course catalogue, course proposals, a training history, a qualifications catalogue, and qualifications profiles, which are presented in a personalized form. Further, the learning portal 42 may support online registration by a trainee user.

A learning management system 44 operates to control an individual learning (or training) process, and handles the management of administrative aspects of a training course. The learning management system 44 furthermore offers courseware authors (author users) integrated tools to structure courses and create content, and also supplies the learning portal 42 with data concerning a particular trainee user. The learning management system 44 further facilitates integration of e-learning applications with other applications that may be included within an ERP deployment. To this end, the learning management system 44 is shown conceptually to manage a trainee user account 46 by implementing a learning strategy associated with the account 46, and also tracking progress through a course, or multiple courses. The learning management system 44 is also shown to control the content player application 4 by recognizing a learning strategy associated with a particular trainee user, guiding a trainee user through a course, and determining learning progress, which is then reflected in the trainee account 46.

An authoring environment 50 is provided to courseware authors (author users) to design, create and structure modularized, reusable training content and tests, which may be web-based. Further details regarding the authoring environment 50 are discussed below.

A content management system 52 stores and manages training content, and can be accessed either by a training provider who plans and develops a course catalogue, or an author user who registers an actual course content.

Figure 3:
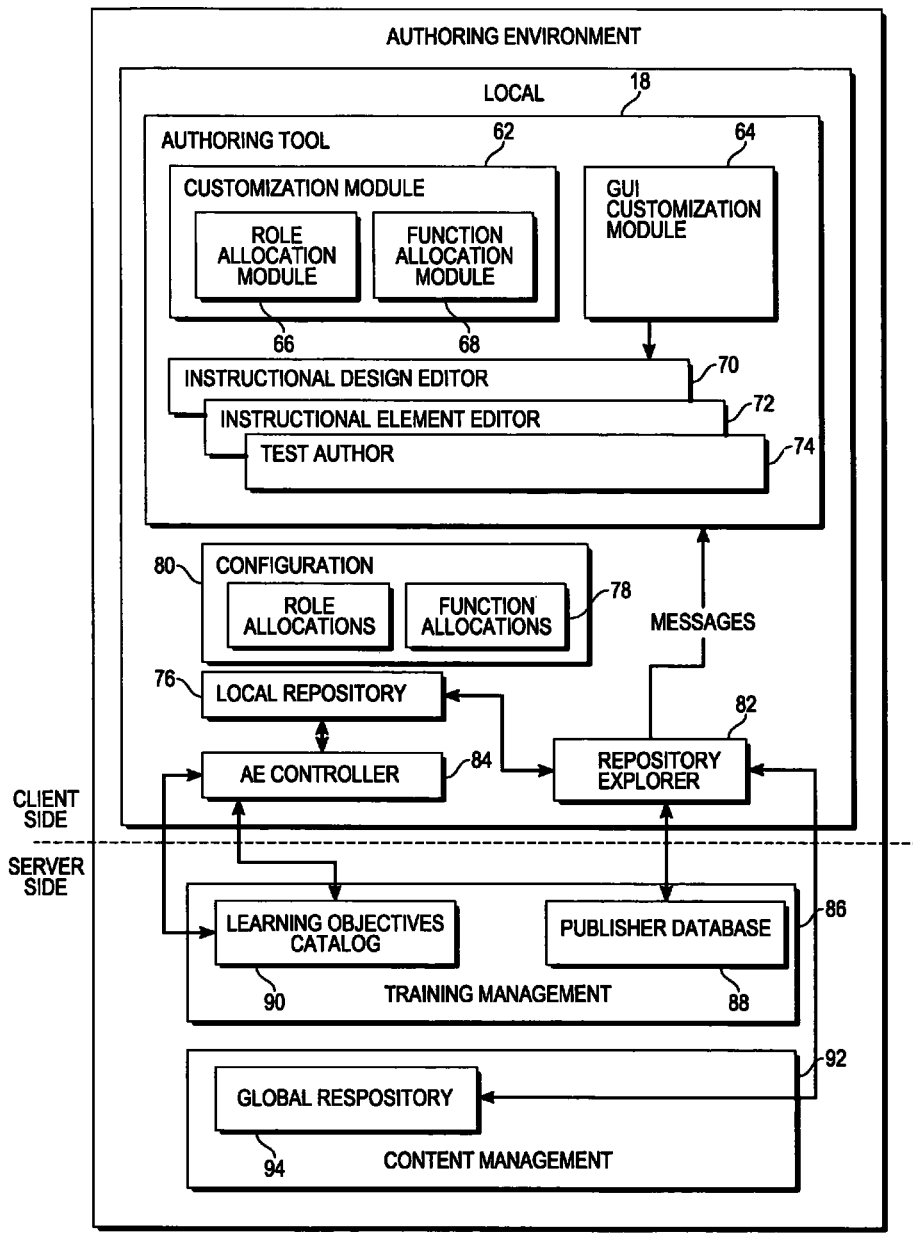
FIG. 3 is a block diagram providing further details regarding the components and elements included within an authoring environment, according to one embodiment of the present invention.

FIG. 3 is a block diagram providing further details regarding the components and elements included within the authoring environment 50, according to one embodiment of the present invention. FIG. 3 illustrates the authoring environment 50 as having a client side and a server side, with the client side components being local 60 to a client system 12, for example. As described above with reference to FIG. 1, an authoring tool 18 may reside and be hosted on a client system 12, and is shown to include a customization module 62, a GUI customization module 64, an instructional design editor 70, an instructional element editor 72, and a test author 74.

Turning first to the customization module 62, the module 62, according to an exemplary embodiment of the present invention and as more fully described below, is configured to facilitate customization of the authoring tool 18. This customization extends to customization based on a user role that a particular author user may assume with respect to the authoring tool 18 (e.g., an instructional designer role or a subject matter expert role). To this end, the customization module 62 is shown to include a role allocation module 66, which operates to present a number of user-selectable roles to a author user, and to record user-selection of a particular role, and a function allocation module 68, which operates to present a set of user-selectable functions to be associated with a selected role, and to record this allocation.

The GUI customization module 64 operates to customize one or more graphical user interfaces that may be presented to a user, this customization being performed based on the role allocated to a particular user. To this end, the GUI customization module 64 is shown to communicate with the instructional design editor 70, the instructional element editor 72, and the test author 74 for the purposes of customizing interfaces that may be presented by these components. While the GUI customization module 64 is shown in FIG. 3 to be separate from the components 70-74. In alternative embodiments, a respective GUI customization module may form part of each of the components 70-74.

Figure 4:
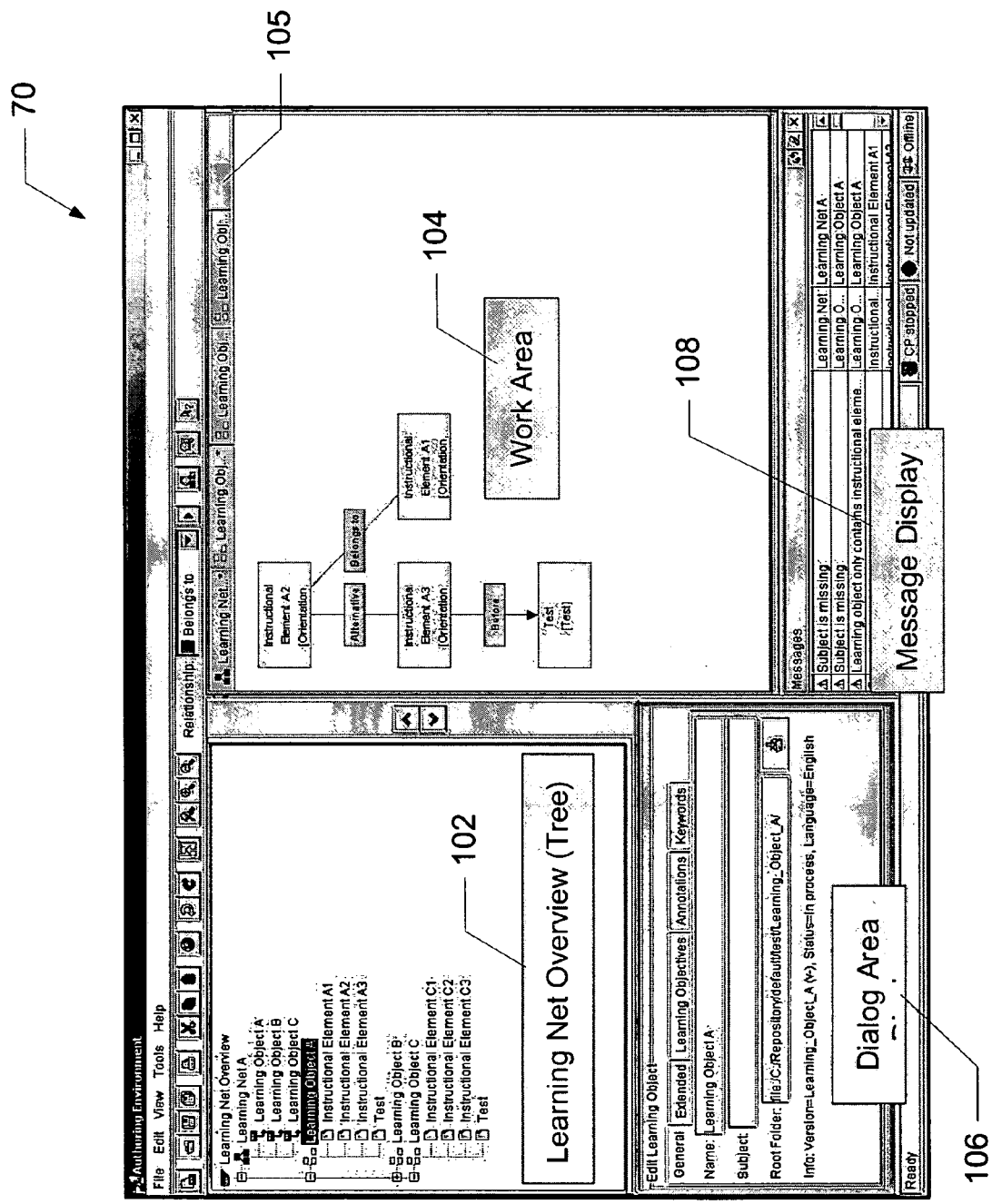
FIG. 4 is a block diagram illustrating UI components of the instructional design editor, according to an exemplary embodiment of the present invention.

The instructional design editor 70, as noted above, is utilized by an author user for the creation and structuring of learning content for a computer-based training course. FIG. 4 illustrates UI components of the instructional design editor 70, according to an exemplary embodiment of the present invention. A learning net overview 102 displays learning nets (discussed in further detail below), learning objects and instructional elements in a tree structure, the various nets, objects and elements being shown in the sequence in which they were created. Units of the same kind are presented at a common level. A work area 104 provides an alternative view on the "learning net overview". A navigation between learning nets and learning objects is performed utilizing a tag strip 105 located at the top of the work area 104. A dialog area 106 enables the editing of metadata and attributes associated with learning nets, learning objects and instructional elements. A message display 108 displays information, warnings, errors and fatal errors concerning learning nets, learning objects and their references, instructional elements and messages. The messages displayed in the message display 108 are received from a repository explorer 82, which is included within the authoring tool 18 and which is described in further detail below.

Figure 5:
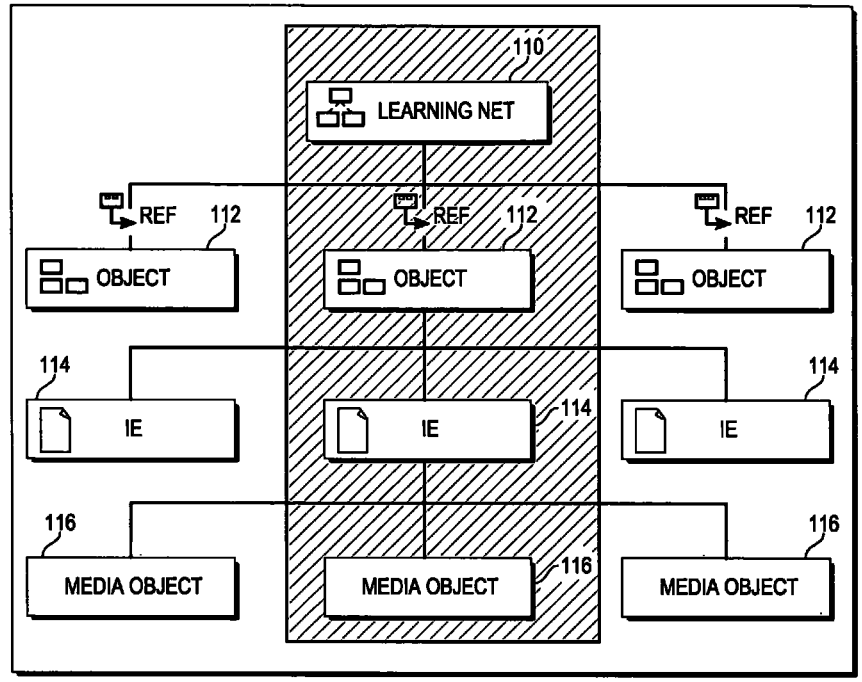
FIG. 5 is a block diagram providing details regarding a learning net, according to an exemplary embodiment of the present invention.

A training course created within the authoring environment 50 utilizing the instructional design editor 70 of the authoring tool 18 may, as noted above, conveniently be termed a "learning net". FIG. 5 is a block diagram providing further detail regarding a learning net 110, according to an exemplary embodiment of the present invention. The learning net 110, according to one exemplary embodiment of the present invention, is a computer-based training course created within the authoring environment 50, utilizing the authoring tool 18. The learning net 110 is comprises of learning objects 112, instructional elements (IEs) 114 and tests, which may include one placement and one final test.

Each learning object 112 is a shell that may comprise multiple instructional elements 114, and optionally tests dealing with a particular subject. A learning object 112 may be self contained, independent and reusable. Furthermore, each learning object 112 includes didactical and technical metadata.

An instructional element 114 is the smallest didactical unit in a learning net 110, and may comprise actual course content viewed by a trainee user. In addition to attributes (e.g., knowledge category, media type, etc.), each instructional element 114 is assigned a source file containing editable content, and a content file holding a viewable content in a displayable format.

A test may be an independent part of learning content at the level of a learning object 112, or a learning net 110. It is envisaged that multiple different types of tests may be included within learning content.

It will also be noted from FIG. 5 that learning nets 110 and learning objects 112 may contain links to other learning nets, learning objects or media objects within a repository. The connection between a learning net and its object (or subnets) is obtained through such references. Attributes assigned to a reference may differ from those stored within a particular object.

The authoring tool 18 may be utilized to design and create computer-based (e.g., both online and offline) training courses. To this end, the authoring tool 18 includes the three above-described editors, namely the instructional design editor 70 for creating and structuring learning content, the instructional element editor 72 for creating learning content (a.k.a., instructional elements), and the test author 74 for creating integrated common object-oriented tests and certification for assessment purposes.

The instructional element editor 72, in one exemplary embodiment of the present invention, presents format templates to enable a uniform presentation of texts, into which hyperlinks and email links can be integrated. Supported formats that may be included within a computer-based training course include Flash, MS PowerPoint, MS Word, MS Excel, PDF, element and background graphics, and main and background audio and video. To support novice author users, the instructional element editor 72 may include one or more wizards (not shown) to lead the author user through a page creation and layout process on the basis of a variety of questions that are presented to the author user. These questions may serve to define a type and purpose of an instructional element, as well as the type of content to be included.

Returning now to FIG. 3, and specifically the test author 74 included within the authoring tool 18, the test author 74 is a tool for planning, designing, creating and managing tests and feedback measures. Appraisals and evaluations of a trainee user's skills or knowledge enable a test environment to individually adapt and monitor a learning process, and also to evaluate a learning process and success thereof.

The authoring tool 18 also includes a local repository 76, which is a directory structure of a local hard drive where all the locally created objects (e.g., learning nets, learning objects and instructional elements) are stored. Configuration information pertaining to the authoring environment includes role allocation and function allocation data structures 78 and 80, the data structures 78 and 80 having been created by the role allocation and function allocation modules 66 and 68, respectively. The role allocation and function allocation data structures 78 and 80 are accessed by the GUI customization module 64 so as to enable the GUI customization module 64 appropriately to customize interfaces presented via the components 70-72, as presented to an author user. In various embodiments of the present invention, the role allocation and function allocation data structures 78 and 80 may comprise database tables of central database (e.g., relational tables), or other data structures such as an XML data structure.

FIG. 3 also shows that a global repository 94 may be maintained on the server side of the authoring environment 50, as part of a content management system 92. The global repository 94 is a central storage location for learning nets, learning objects and media objects, which are accessible to multiple author users. The repository explorer 82, in one embodiment of the present invention, operates to transfer data between a local repository 76, where course content may be displayed and edited, and the global repository 94, which is accessible to all author users.

Moving on now to the server side of the authoring environment 50, and specifically to a training management component 86, a learning objectives catalogue 90 stores a collection of learning objectives (not shown) which may be assigned to learning nets and learning objects in order to establish a trainee user's level of knowledge. A learning objectives manager (not shown) is utilized to manage and define learning objects.

According to one embodiment of the present invention, the authoring tool 18 may support the allocation of at least one of multiple roles to an author user. Certain functions may be deactivated according to a specific role assigned to an author user. Further, two or more views may be presented, via the components 70-74, between which an author user may switch if necessary.

Figure 6:
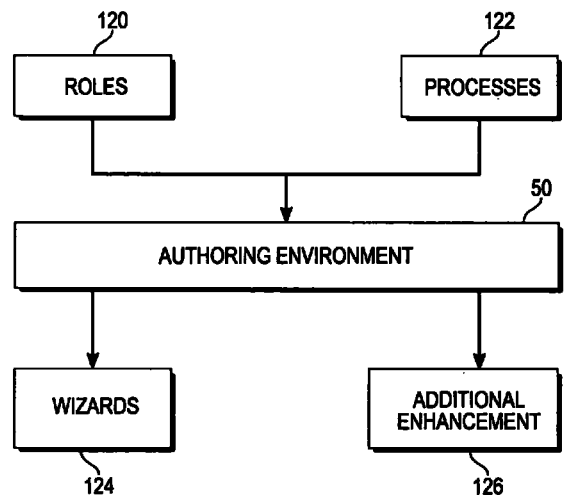
FIG. 6 is a block diagram illustrating, according to one exemplary embodiment of the present invention, roles and processes mapped into the authoring environment, thus enabling role-based customization of views, according to functions associated with such roles.

A roles-based approach, as proposed according to one aspect of the present invention, enables the mapping of certain functions onto tasks for each author user's role. Further, an author user who has outgrown his or her role can switch to an advanced role, at his or her discretion. FIG. 6 is a block diagram illustrating, according to one exemplary embodiment of the present invention, roles 120 and processes 122 mapped into the authoring environment 50, thus enabling role-based customization of views, according to functions associated with such roles. Accordingly, a role may be viewed as serving as a foundation for a functionally adapted view, with hidden functions being available for re-activation utilizing the customization module 62 described above. The definition of roles may be implemented using wizards 124, or additional enhancements provided by the customization module. The customization of user interfaces, as enabled by the customization module 62, and as implemented by the GUI customization module 64, enable, in one embodiment, an author user manually to select or deselect individually favored functionality. Offering an author user several customizing options is advantageous in that the author user is provided with the capability to alter the authoring tool 18 to meet personal requirements. While the customizing of an application, such as the authoring tool 18, typically requires an intimate knowledge of the application to be customized, the present invention, according to a further aspect, proposes simplifying the customization process by classifying functions that may be associated with a particular role as either being default associated with the role, default non-associated with the role, but selectable, and functions which cannot be associated with a particular role.

Figure 7:
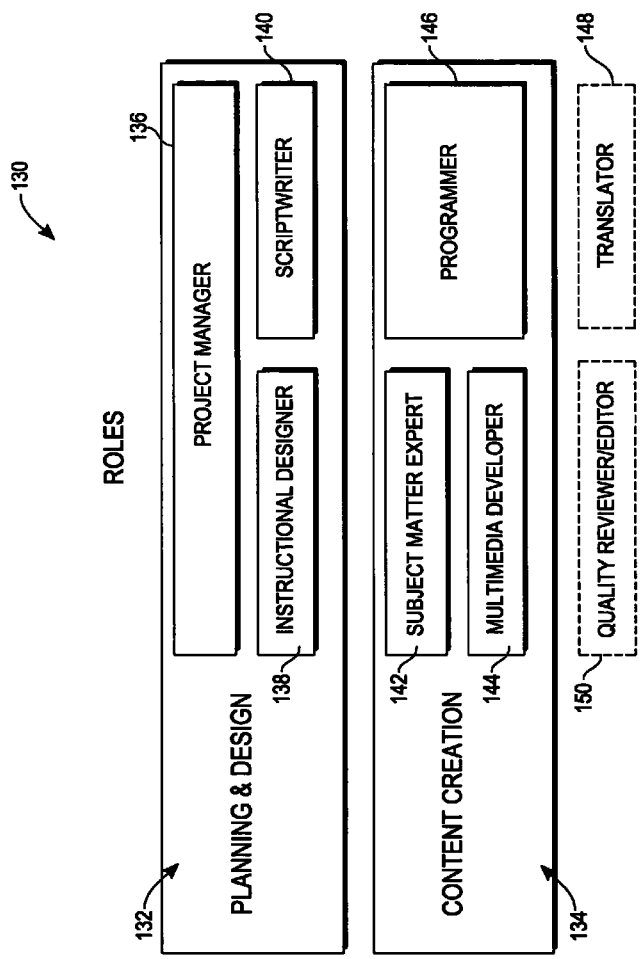
FIG. 7 is a block diagram illustrating exemplary roles that may be defined within a project team undertaking the definition and creation of a computer-based training course.

Before proceeding with a discussion of the manner in which role-based functionality can be defined and is expressed within a user interface, it is useful to consider roles 130 that may be defined with respect to an exemplary application in the form of the authoring tool 18. In today's fast moving business world, the complex task of developing training courses for multimedia learning typically cannot be completed single handedly. Accordingly, a project team is often assigned to the task of creating a training course. FIG. 7 is a block diagram illustrating exemplary roles 130 that may be defined within a project team undertaking the definition and creation of a computer-based training course.

As shown in FIG. 7, the design and creation of a training course may involve a planning and design phase 132 and a content creation phase 134. Within the planning and design phase 132, a project manager 136 coordinates the development team and also accounts for budgeting, time management, and operational and strategic planning. An instructional designer 138 may assume many of the responsibilities of a project manager, and is primarily focused on the development of a methodical design of a computer-based training course. A scriptwriter 140 may be an expert in didactics, and is responsible for the creation and administration of a script. In consultation with the multimedia developers, a scriptwriter 140 may decide on words, images, video and audio elements, as well as providing navigational directions, special functions, links and other software behavior definitions.

Turning now to the content creation phase 134, a subject matter expert 142 (who may also be referred to as a content expert) creates material for the computer-based training course in order to impart knowledge and to place tests. Multimedia developers 144 are typically graphic artists, audio producers and video producers, who may form part of a broader multimedia development team. A graphic artist may work on the design of a user interface (e.g., screen layout, as well as single items such as buttons, windows, menus or other specific graphics, animations, diagrams or photography). An audio and/or video producer conducts a complete production process for video and/audio elements. A programmer 146 processes the deliverables of the subject matter experts 142, by creating actual media content by integrating the work of the graphic artist, and audio and video producers. Programmers 146 often work with authoring tools and HTML.

Subsequent to the content creation phase 134, one or more translators 148 may be responsible for the translation into one or more languages. A quality reviewer/editor 150 may, throughout an entire development process, continue to check the computer-based training program (e.g., check the functional quality, content accuracy, logic, inconsistencies, performance, operability, accessibility and usability).

The above-described roles are merely examples of roles that may be defined within a team that is tasked with the design and creation of a computer-based training program. The above roles are described as example of roles to which sets of functions may be allocated, and according to which a graphical user interface may be customized.

Figure 8:
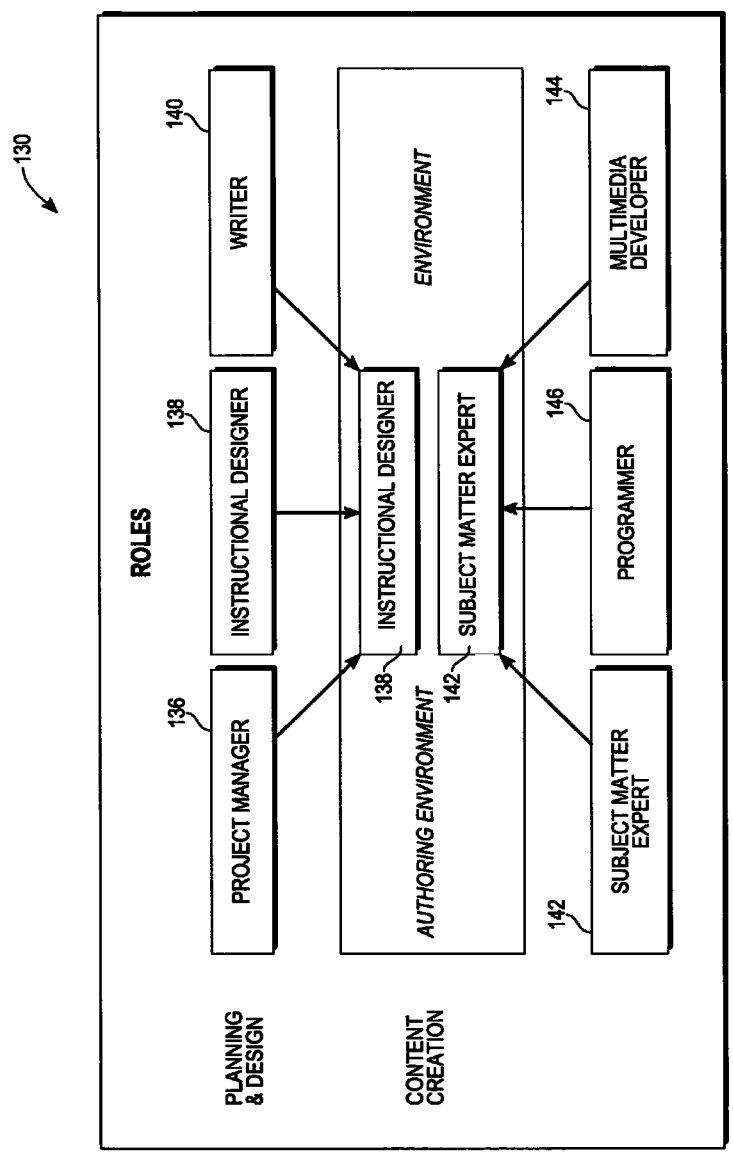
FIG. 8 is a block diagram to illustrate how, in a particular exemplary deployment, a number of the roles described with reference to FIG. 7 may be collapsed.

FIG. 8 is a block diagram to illustrate how, on a particular exemplary deployment, a number of the roles described with reference to FIG. 7 may be collapsed. Specifically, the project manager, instructional designer, and scriptwriter roles 136, 138 and 140 are shown to be collapsed into an instructional designer role 138, and the subject matter expert, multimedia developer and programmer roles 142, 144 and 146 are shown to be collapsed into a subject matter expert role 142. The combined instructional designer and subject matter expert roles 138 and 142 are further discussed below, in order to provide a simpler example regarding the customizable allocation of functions to roles within an authoring tool 18. Table 1, shown below, provides exemplary tasks that may be allocated to each of the instructional designer and subject matter expert roles 138 and 142.

TABLE 1

Roles and Tasks within the Authoring Environment

| Role | Task |
| --- | --- |
| Instructional Designer | Create/modify active course structure |
|  | Identify software requirements and installations |
|  | Release final version |
|  | Publish all final Versions |
|  | Perform testing |

TABLE 1-continued

Roles and Tasks within the Authoring Environment

| Role | Task |
|---|---|
| Subject Matter Expert | Provide content |
| | Identify software requirements and installations |
| | Produce media |
| | Design interface and navigation icons |
| | Create prototypes and final versions |
| | Create course support |

Of course, the above-indicated tasks are merely exemplary, and in a typical deployment, a larger set of tasks may be allocated to each role. Further, each of the tasks listed in Table 1 may include a number of sub-tasks, which are not shown. In one embodiment of the present invention, the authoring tool 18 may provide an extensive set of functions that are available to an author user, operating in one of a plurality of roles. Table 2, below, provides a list of exemplary functions that may be available to an author user:

TABLE 2

General Functions

Function

Work on-/offline
New - Learning Net | Learning Object | Online Test | Element - Test
New - Element - Instructional Element
Open | Close
Save | Save All
Save As
Save As Template - Learning Net | Learning Object
Save As Template - Instructional Element | Test
Printer | Printer - Setup
Exit
Cut | Copy | Delete - Object
Cut | Copy | Delete - Segment
Paste
Undo | Redo
Relationships
Open All
Display Content | Display References Overview
Graphic - Update | Zoom In | Zoom Out | Original Size
Display Messages
Content Player Console
Print Graphic Display
Reference - Learning Net/Object | Media Object
Import Resources - in Learning Net/Object | As Reusable Media Object
Learning Objectives Manager
Templates Manager | Repository Explorer | Packaging
Play Learning Net/Object
Configuration
Learning Net Conversion
Online Help |
System Information
About Plug-Ins
About
Enable Context-Sensitive Online Help
Tree - Collapse All
Edit Learning Net
Edit Learning Net - General - Name
Edit Learning Net - General - Subject
Edit Learning Net - General - Source
Edit Learning Net - General - Overview
Edit Learning Net - General - Root Folder
Edit Learning Net - General - Info
Edit Learning Net - Extended - Learning Time
Edit Learning Net - Extended - LOM File
Edit Learning Net - Extended - Find LOM File
Edit Learning Net - Extended - Placement Test
Edit Learning Net - Extended - Final Test

TABLE 2-continued

General Functions

Function

Edit Learning Net - Extended - Display thumbnail images for Objects
Edit Learning Net - Learning Objectives
Edit Learning Net - Annotations | Keywords
Edit Learning Object
Edit Learning Object - General - Name
Edit Learning Object - General - Content
Edit Learning Object - General - Find Media Object
Edit Learning Object - Extended - Learning Time
Edit Learning Object - Extended - Thumbnail
Edit Learning Object - Extended - Top item for laying out the graphical display
Edit Learning Object - Annotations | Keywords
Edit Instructional Element
Edit IE - General - Knowledge Category
Edit IE - General - Media Type
Edit IE - General - Name
Edit IE - General - Source
Edit IE - General - Content
Edit IE - Extended - Learning Time
Edit IE - Extended - LOM File
Edit IE - Extended - Thumbnail
Edit IE - Extended - Top item for laying out the graphical display
Edit IE - Annotations | Keywords
Edit Test
Edit Test - General - Test Type
Edit Test - General - Name
Edit Test - General - Source
Edit Test - General - Content
Edit Test - Extended - Learning Time
Edit Test - Extended - LOM File
Edit Test - Extended - Thumbnail
Edit Test - Extended - Top item for laying out the graphical display
Edit Test - Annotations | Keywords It will be appreciated that not of all the above functions would be required by every member of a development team and in fact only a subset may be required to complete the tasks associated with a particular role. An authoring tool, in which all of the above functions are presented to any author user, regardless of role, would likely be intimidating to a novice author user. Accordingly, one aspect of the present invention seeks to simplify the presentation of functions to an author user, dependent upon the role to which that author user has been allocated within a development process for a computer-based training course.

Figure 9:
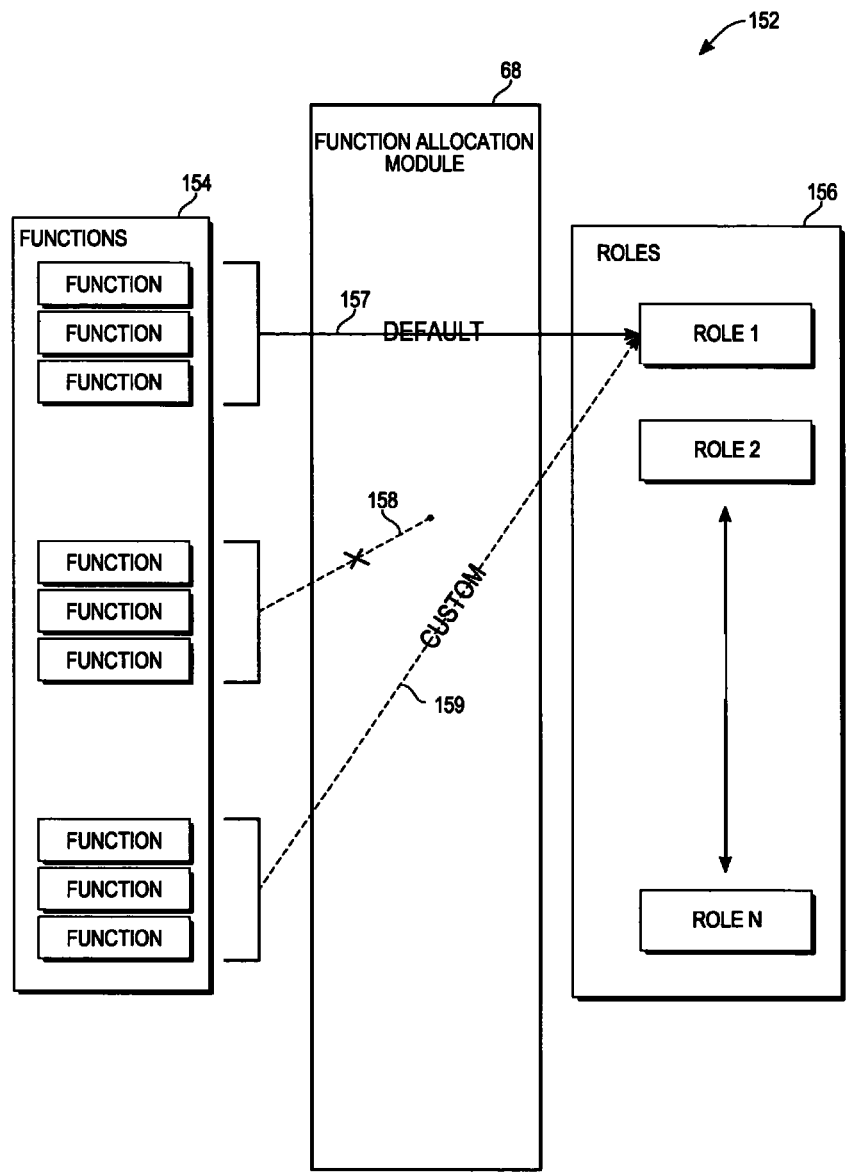
FIG. 9 is a block diagram illustrating, according to an exemplary embodiment of the present invention, an allocation of functions to a specific role of a collection of roles by the function allocation module.

FIG. 9 is a block diagram illustrating, according to an exemplary embodiment of the present invention, an allocation of functions 154 to a specific role of a collection of roles 156 by the function allocation module 68. As shown, the function allocation module 68 supports three allocation states for each function 154 with respect to a particular role 56. Specifically, a function 154 may be allocated as a "default allocated" state 157 with respect to a particular role. Here, the function allocation module 68 is programmed to regard the function most likely required, or absolutely required, for completion of tasks associated with the relevant role 156.

A second allocation supported by the function allocation module 68 is that of "unallocated and blocked" state 158. In this case, the function allocation module 68 is programmed to prevent the allocation of a particular function 154 to a specific role 156. The prevention of an allocation of a function 154 to a role 156 may be desirable for a number of reasons, including security reasons.

Finally, the function allocation module 68 also supports an "unallocated and allocatable" (or customizable) state 159 for a specific function 154 with respect to a specific role 156. In this case, the function allocation module 68 may be programmed to facilitate the allocation of a previously unallocated function 154 to a specific role 156. Such functions are accordingly regarded by the function allocation module 68 as eligible for allocation to a particular role, and may then either be allocated or unallocated according to a user preference. The method discussed below with reference to the flowchart illustrated in FIG. 10 deals specifically with the custom allocation of eligible functions 154 to a specific role 156.

Figure 10:
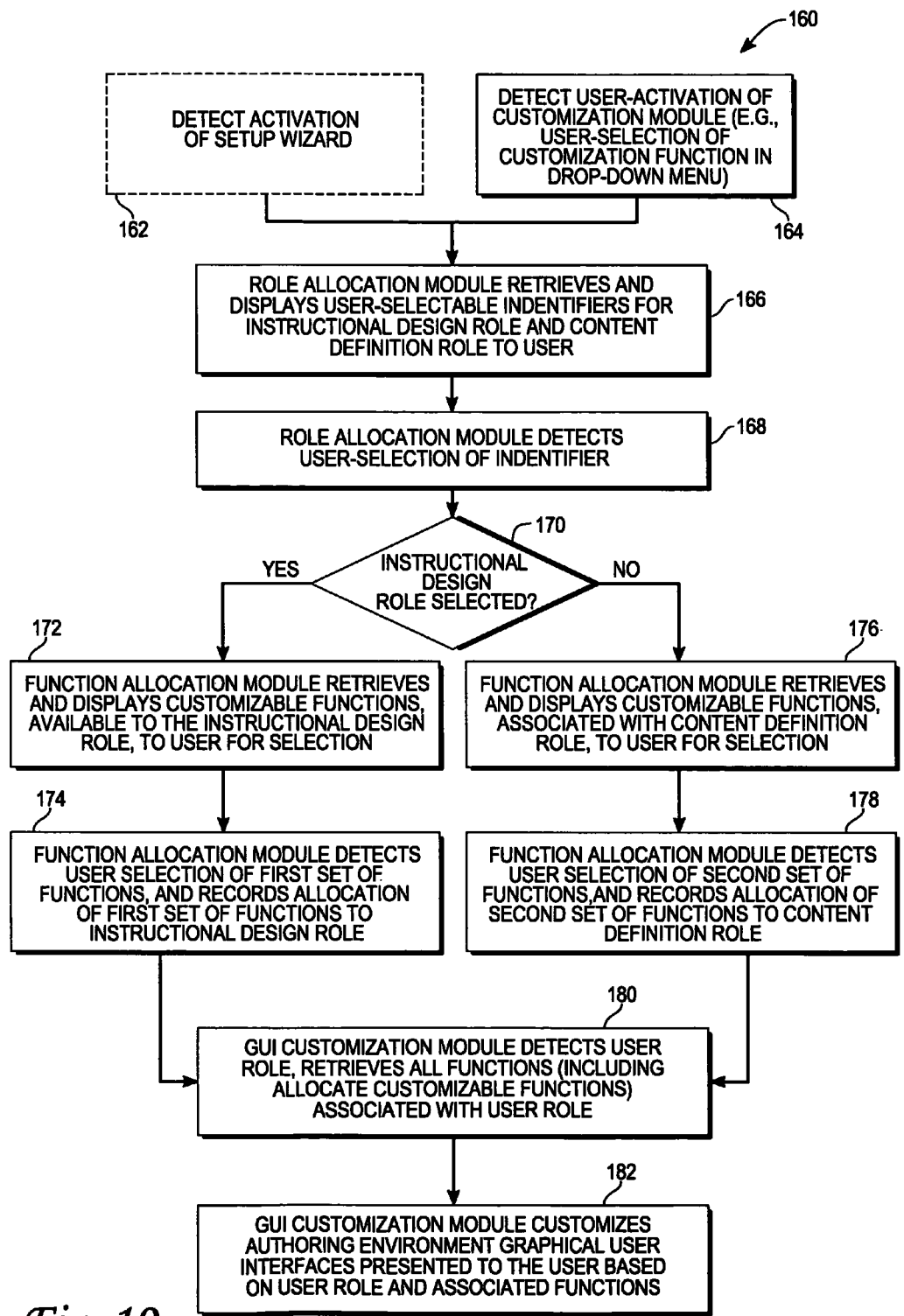
FIG. 10 is a flowchart illustrating a method, according to an exemplary embodiment of the present invention, to facilitate user selection and allocation of functions, provided by authoring tool, to a specific role that an author user has elected to assume.

FIG. 10 is a flowchart illustrating a method 160, according to an exemplary embodiment of the present invention, to facilitate user selection and allocation of functions 154, provided by authoring tool 18, to a specific role 156 that an author user has elected to assume. The method 160 includes three high level operations, namely the detection and recording of a role allocation for an author user, the detection and storing of function allocations with respect to the selected role, and the modification of a user interface in accordance with the role and function selections.

The method 160, in one embodiment, begins at block 162 with the detection of activation of a setup wizard by an author user, which then calls the customization module 62. Alternatively, the method 160 may commence with the detection of activation of the customization module 62 by an author user. For example, at block 164, the authoring tool 18 may detect user-selection of a customization function from a drop-down menu presented by the authoring tool 18. In any event, the method 160 commences with an automatic or manual activation of the customization module 62.

Figure 11:
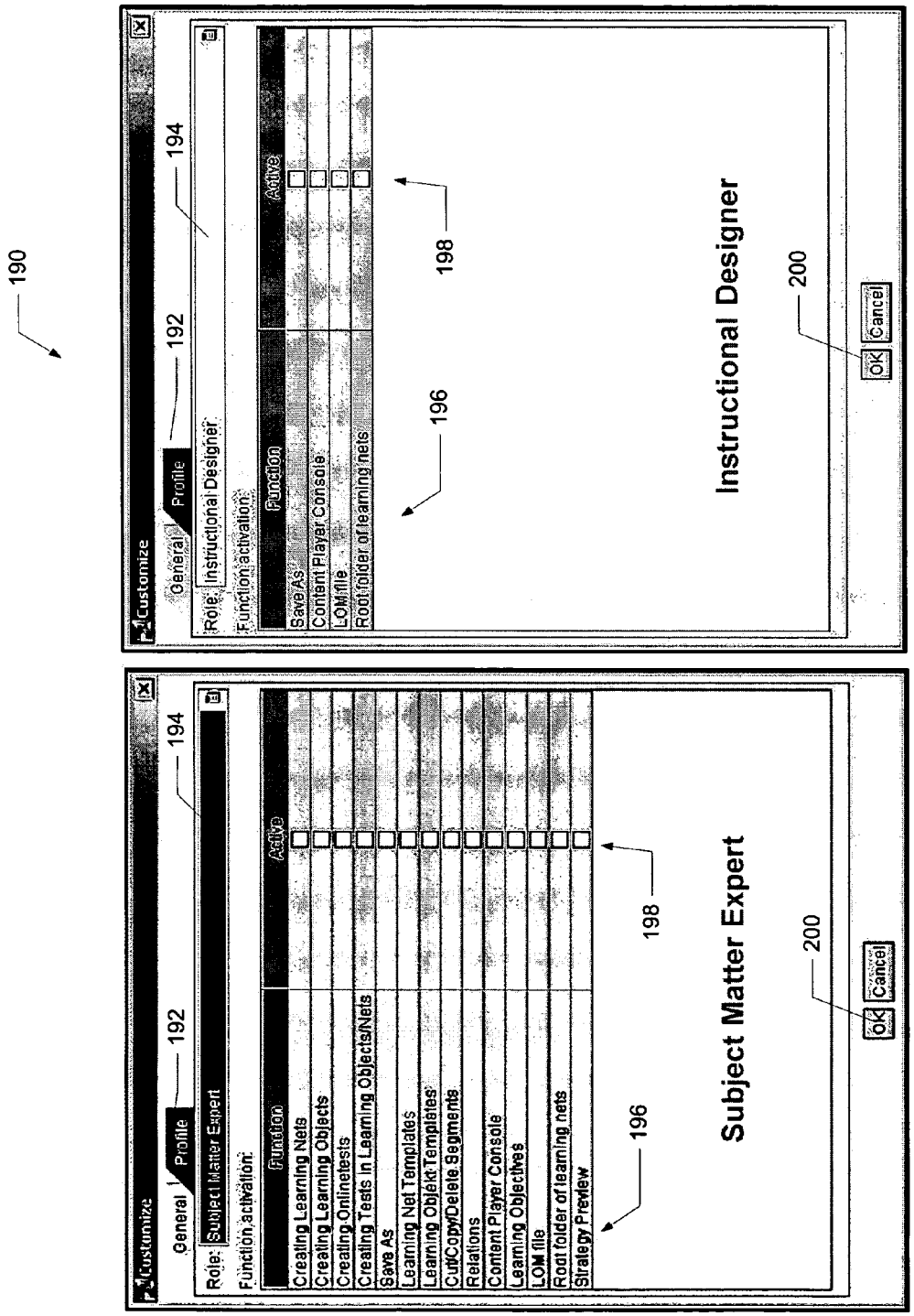
FIG. 11 shows two screen shots of a customization interface that may be presented to an author user at block responsive to activation of the customization module.

At block 166, the role allocation module 66 retrieves and displays user-selectable identifiers for each of the instructional design and content definition roles. FIG. 11 shows two screen shots of a customization interface 190 that may be presented to an author user at block 166 responsive to activation of the customization module 62. As shown, the customization interface 190 includes a profile tab 192 that, when selected, presents a role field 194, which can be populated from a drop-down menu that includes roles that are available to the author user for selection. The left-hand version of the customization interface 190 shows the role field 194 as having the "subject matter expert" role selected, while the right-hand version of the customization interface 190 indicates the "instructional designer" role as having been displayed and selected by an author user.

Returning to FIG. 10, at block 168, the role allocation module 66 detects user selection of an identifier associated with a particular role. For example, with reference to the customization interface 190, the customization module 66 may detect user selection of a textual identifier (e.g., the text "subject matter expert") as presented within a drop-down menu associated with the role field 194.

At decision block 170, the role allocation module 66 determines whether the instructional design role has been selected. If so, the method 160 advances to block 172, where the function allocation module 68 is invoked to retrieve and display functions 156, in the "custom" state 159 and which are eligible for association with the instructional design role, to the user for selection. For example, again referencing the customization interface 190 shown in FIG. 7, the right-hand version of the interface 190 illustrates a set of functions 196 that are available for allocation to the instructional designer role, but that have as yet not been allocated and activated for the instructional design role, as occupied by the author user.

At block 174, the function allocation module 68 detects user selection of a first set of functions to be allocated and activated with respect to the instructional design role, and then proceeds to record this allocation of the first set of functions to the relevant role. Referring again to FIG. 11, the customization interface 190 includes a graphical use-selection mechanism, in the exemplary form of check boxes 198, utilizing which the author user may select which functions are to be allocated and activated with respect to the selected role, as occupied by the author user. Having checked the relevant check boxes 198, the author user selects an OK button 200 to register the function selection. Returning to decision block 170, in the event the instructional design role is not selected, in the exemplary embodiment, the method 160 then proceeds to blocks 176 and 178 where, in a manner substantially similar to that described above with reference to blocks 172 and 174, the function allocation module 68 retrieves and displays customizable functions, available to a content definition role, and detects and records an allocation of a second set of functions to the content definition role.

The role and function allocations are detected and stored by the role and allocation modules 66 and 68. As discussed above with reference to FIG. 3, the role and function allocations may be stored within the authoring tool 18 (or at a central data repository), as role allocation and function allocation data structures 78 and 80, these data structures being, for example, database tables or XML data structures.

Having completed blocks 174 or 178, the method 160 then moves on to block 180, where the GUI customization module 64 detects the role of a logged in author user, retrieves all functions (including the allocated, customizable functions allocated in blocks 172-178) associated with the relevant user role. Block 180 may, for example, be invoked responsive to the author user invoking the instructional design editor 70, the instructional element editor 72 or the test author 74, the GUI customization module 64 in these cases operating to modify and customize the interfaces for these components.

At block 182, the GUI customization module 64 then customizes the graphical user interfaces of the authoring environment 50, based on the identified user role and the functions that have been associated with that author user role.

Figure 12:
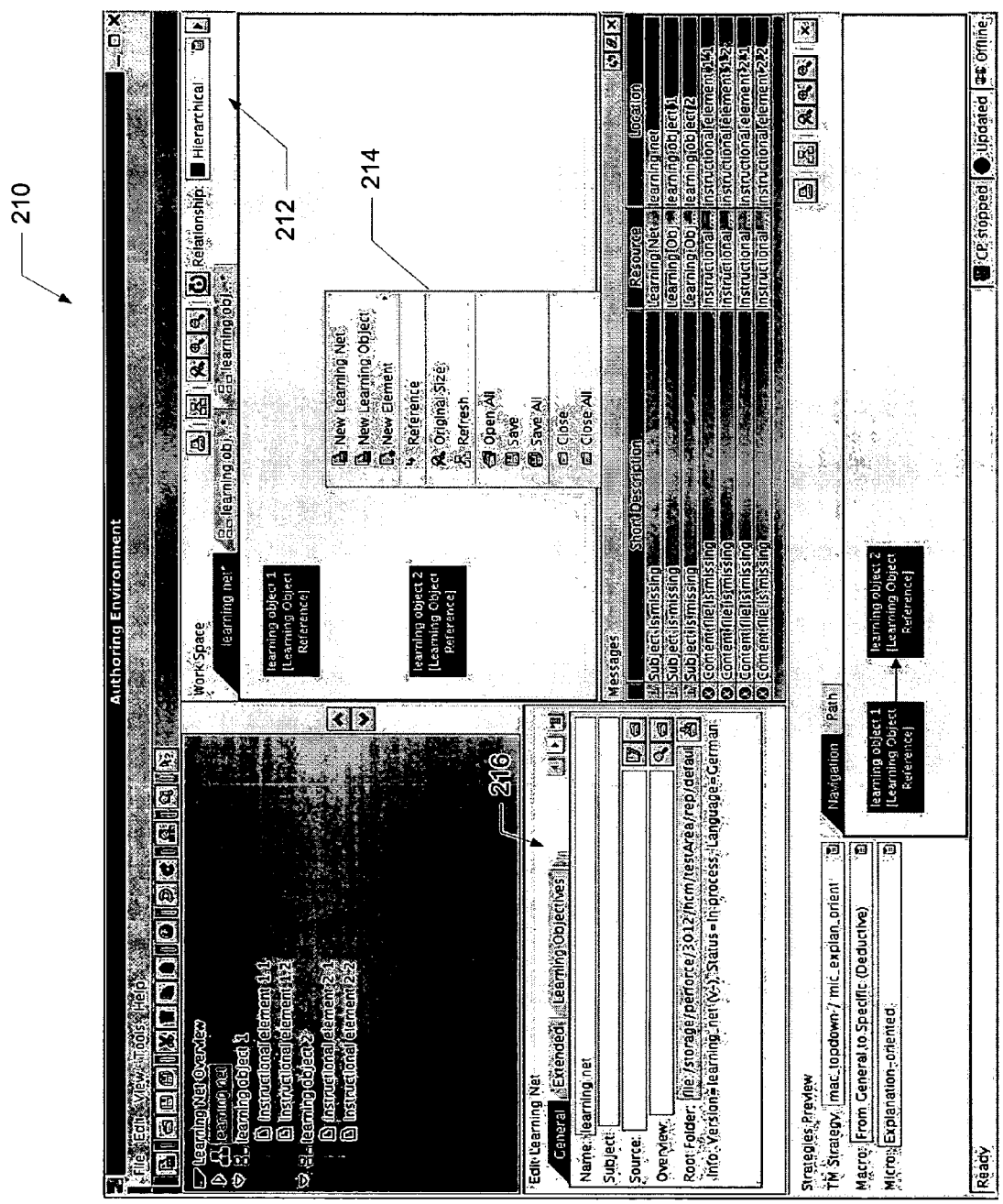
FIGS. 12 and 13 illustrate respective interfaces, generated by the instructional design editor, that have been customized by the GUI customization module.
Figure 13:
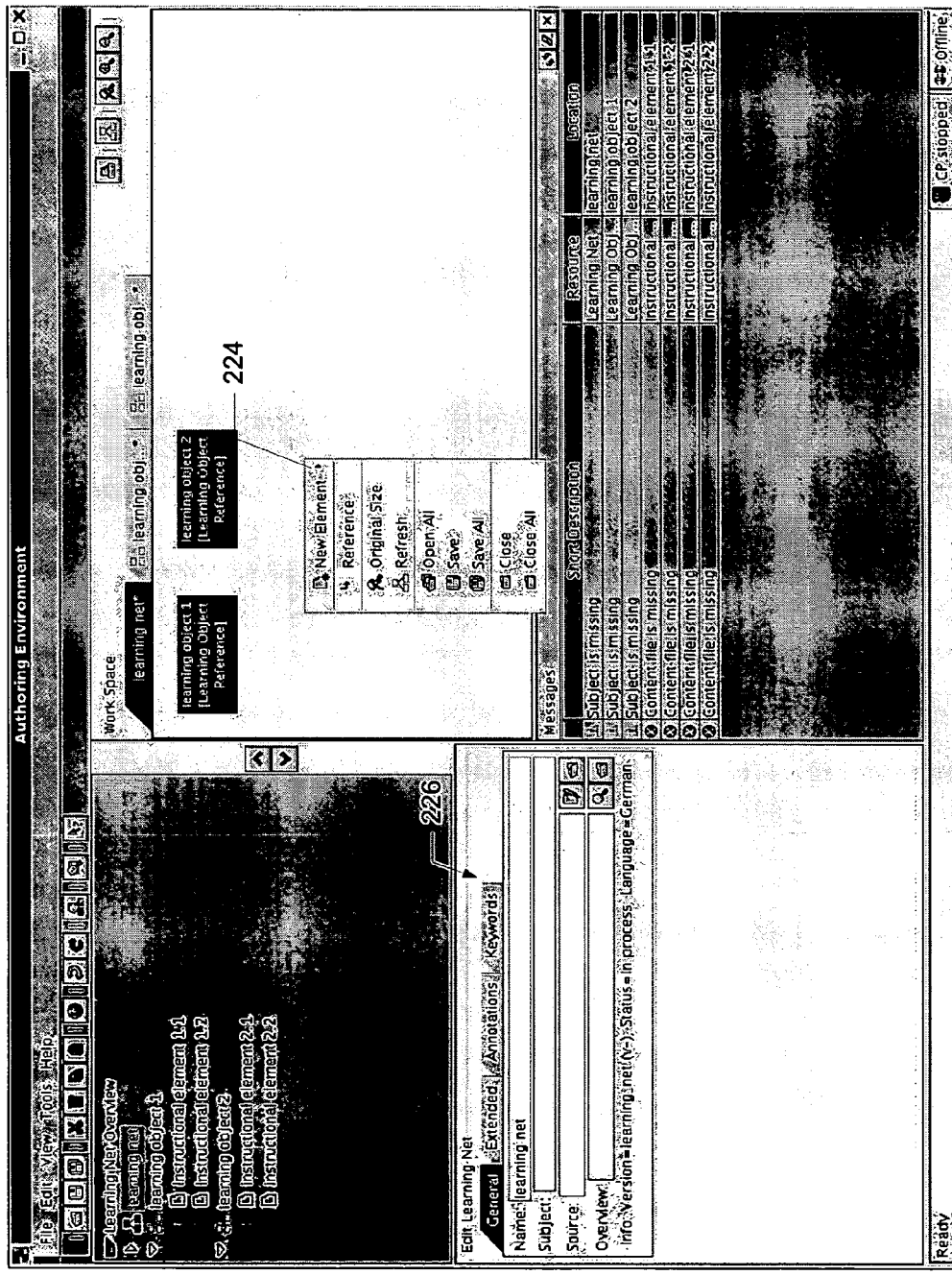

FIGS. 12 and 13 illustrate respective interfaces 210 and 220, generated by the instructional design editor 70, that have been customized by the GUI customization module 64. The interface 210 is customized for an instructional design role, whereas the interface 220, shown in FIG. 13, is customized for a subject matter expert role. Juxtaposing the interfaces 210 and 220, it will be noted that the interface 210 is, at 212, provided with a relationship field that is selectable to define relationships between objects displayed in the work area 104 of the interface 210. This relationship field 212 is, however, absent from the interface 220, reflecting that this is a function that has not been allocated and activated for the subject matter expert role (for the relevant author user). Similarly, comparing the menus 214 and 224 shown within the interfaces 210 and 220, it will be noted that menu 214, presented to the instructional designer, includes a number of additional functions (e.g., "new learning net" function and a "new learning object" function) that are absent from the corresponding menu 224 of the interface 220, as customized for the subject matter expert role. Further, it will be noted that there are differences in the tag lines 216 and 226 presented within the dialog areas of the respective interfaces 210 and 220.

Thus, an exemplary embodiment of the present invention, in the form of the authoring tool 18, and a method of operating the same, has been above described. For the purposes of the specification, the term "computer-based training course" should be taken to include training courses that may be distributed via a network (e.g., the Internet or an intranet, such as so-called web-based training courses), as well as training courses that may be distributed for offline training (e.g., via a CD-ROM, or that may execute on a mainframe). The term "computer-based training course" shall also be taken to include so-called "virtual classrooms".

Figure 14:
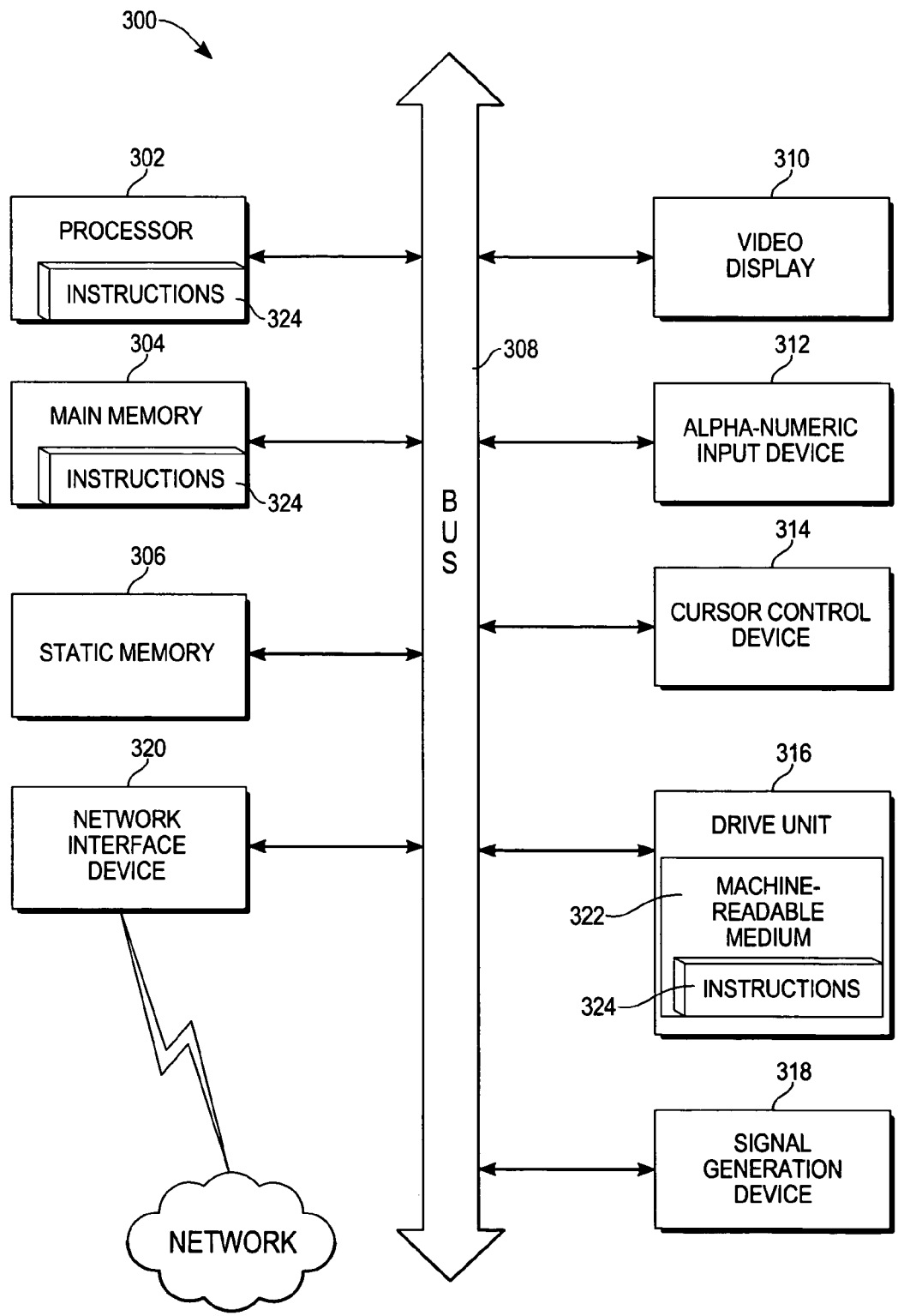
FIG. 14 shows a diagrammatic representation of machine in the exemplary form of a computer system within which a set of instructions, for causing the machine to perform any one or more of the methodologies discussed herein, may be executed.

FIG. 14 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 392 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, an authoring tool to structure and create a computer-implemented training course, and a method of operating the same, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method to configure an authoring tool to author a computer-based training course, the method including:
   storing in a computer device sets of allocation data, wherein each of the sets of allocation data corresponds to a different respective function in a set of functions of an authoring tool, wherein each of the sets of allocation data includes allocation settings which each correspond to a different respective one of an instructional design role and a content definition role, wherein the instructional design role and the content definition role are each for a user to assume with respect to the authoring tool, each of the allocation settings specifying a respective ability to customize an allocation of the function which corresponds to the set of allocation data to the role which corresponds to the allocation setting;
   receiving an indication of a selection by the user of one of the instructional design role and the content definition role;
   in response to the received indication of the role selection, the computer device generating, based on the allocation settings of the sets of allocation data, a list of one or more functions in the set of functions available to be selected for allocation to the one of the instructional design role and the content definition role, and presenting to the user the list of one or more functions in the set of functions;
   receiving an indication of a selection by the user of one of the one or more presented functions; and
   in response to the received indication of the function selection, allocating the selected function to the selected role, the allocating to customize a graphical user interface for the selected role, the customizing to include the selected function in the graphical user interface when the user assumes the selected role, wherein the selected function is available in the graphical user interface to be selectively applied by the user for performing an operation on training course information.

2. The method of claim 1, wherein allocating the selected function to the selected role includes one of allocating a first default set of instructional design functions to the instructional design role, and allocating a second default set of content definition functions to the content definition role.

3. The method of claim 1, wherein presenting the list of one or more functions in the set of functions includes presenting in a first distinct display area a list of functions for selective allocation to only one of the instructional design role and a content definition role, the method further comprising presenting in a second distinct display area a second list of one or more functions in the set of functions for selective allocation to only the other of the instructional design role and a content definition role, the displaying in the distinct first and second display areas in conjunction with a graphical user-selection mechanism so as to facilitate graphical selection of the first and second sets of functions by a user.

4. The method of claim 3, wherein the first and second display areas comprise windows presented within a graphical user interface, and the graphical user-selection mechanism is a collection of check boxes.

5. The method of claim 1, including customizing a display of functions to the user based on a user role to which the user has been allocated, and functions allocated to the user role.

6. The method of claim 5 including customizing the display of functions by selectively displaying user-selectable indicia only for the functions allocated to the user role.

7. The method of claim 6, including displaying the user-selectable indicia within the at least one of a drop-down menu, a pop-up menu, and function tabs within the graphical user interface.

8. A non-transitory machine-readable storage medium storing a set of instructions that, when executed by a machine, cause the machine to perform a method to configure an authoring tool to author a computer-based training course, the method including:

storing sets of allocation data, wherein each of the sets of allocation data corresponds to a different respective function in a set of functions of an authoring tool, wherein each of the sets of allocation data includes allocation settings which each correspond to a different respective one of an instructional design role and a content definition role, wherein the instructional design role and the content definition role are each for a user to assume with respect to the authoring tool, each of the allocation settings specifying a respective ability to customize an allocation of the function which corresponds to the set of allocation data to the role which corresponds to the allocation setting;

receiving an indication of a selection by the user of one of the instructional design role and the content definition role;

in response to the received indication of the role selection, generating, based on the allocation settings of the sets of allocation data, a list of one or more functions in the set of functions available to be selected for allocation to the one of the instructional design role and the content definition role, and presenting to the user the list of one or more functions in the set of functions;

receiving an indication of a selection by the user of one of the one or more presented functions; and in response to the received indication of the function selection, allocating the selected function to the selected role, the allocating to customize a graphical user interface for the selected role, the customizing to include the selected function in the graphical user interface when the user assumes the selected role, wherein the selected function is available in the graphical user interface to be selectively applied by the user for performing an operation on training course information.

9. The non-transitory machine-readable storage medium of claim 8, wherein allocating the selected function to the selected role includes one of allocating a first default set of instructional design functions to the instructional design role, and allocating a second default set of content definition functions to the content definition role.

10. The non-transitory machine-readable storage medium of claim 8, wherein presenting the list of one or more functions in the set of functions includes presenting in a first distinct display area a list of functions for selective allocation to only one of the instructional design role and a content definition role, the method further comprising presenting in a second distinct display area a second list of one or more functions in the set of functions for selective allocation to only the other of the instructional design role and a content definition role, the displaying in the distinct first and second display areas in conjunction with a graphical user-selection mechanism so as to facilitate graphical selection of the first and second sets of functions by a user.

11. The non-transitory machine-readable storage medium of claim 10, wherein the first and second display areas comprise windows presented within a graphical user interface, and the graphical user-selection mechanism is a collection of check boxes.

12. The non-transitory machine-readable storage medium of claim 8, including customizing a display of functions to the user based on a user role to which the user has been allocated, and functions allocated to the user role.

13. The non-transitory machine-readable storage medium of claim 12 including customizing the display of functions by selectively displaying user-selectable indicia only for the functions allocated to the user role.

14. The non-transitory machine-readable storage medium of claim 13, including displaying the user-selectable indicia within the at least one of a drop-down menu, a pop-up menu, and function tabs within the graphical user interface.

* * * * *